United States Patent
Arndt et al.

(10) Patent No.: US 8,114,931 B2
(45) Date of Patent: *Feb. 14, 2012

(54) AQUEOUS ADHESIVE DISPERSIONS

(75) Inventors: Wolfgang Arndt, Dormagen (DE); Rüdiger Musch, Bergisch Gladbach (DE); Knut Panskus, Leverkusen (DE); Thorsten Rische, Unna (DE); Ralf Werner, Dessau (DE); Wolfgang Henning, Kürten (DE)

(73) Assignee: Bayer MaterialScience AG, Leverkusen (DE)

( * ) Notice: Subject to any disclaimer, the term of this patent is extended or adjusted under 35 U.S.C. 154(b) by 815 days.

This patent is subject to a terminal disclaimer.

(21) Appl. No.: 10/939,803

(22) Filed: Sep. 13, 2004

(65) Prior Publication Data

US 2005/0131109 A1 Jun. 16, 2005

(30) Foreign Application Priority Data

Sep. 18, 2003 (DE) .................................. 103 43 675

(51) Int. Cl.
*B60C 1/00* (2006.01)
*C08K 3/34* (2006.01)
*C08G 18/08* (2006.01)

(52) U.S. Cl. ........ 524/261; 524/493; 524/839; 524/492; 524/591

(58) Field of Classification Search ................. 524/261, 524/493, 839, 492, 591
See application file for complete search history.

(56) References Cited

U.S. PATENT DOCUMENTS

| 3,640,967 A | 2/1972 | König et al. ............... 260/77.5 |
| 3,658,746 A | 4/1972 | Rosendahl et al. ..... 260/30.8 DS |
| 4,108,814 A | 8/1978 | Reiff et al. ............. 260/29.2 TN |
| 4,808,691 A | 2/1989 | König et al. .................... 528/76 |
| 4,992,481 A | 2/1991 | von Bonin et al. .............. 521/54 |
| 6,077,901 A | 6/2000 | Roesler et al. ................ 524/588 |
| 2003/0191233 A1* | 10/2003 | Lin et al. ...................... 524/588 |

FOREIGN PATENT DOCUMENTS

| CA | 2253119 | 5/1999 |
| DE | 1 570 540 | 3/1970 |
| EP | 286 225 | 10/1988 |
| EP | 924 232 A1 | 6/1999 |
| FR | 2210699 | 8/1974 |
| FR | 2 341 537 | 9/1977 |

OTHER PUBLICATIONS

J. Prakt. Chem. 336 (month unavailable) 1994, pp. 185-200, Hans Josef Laas et al, "Zur Synthese aliphatischer Polyisocyanate—Lackpolyisocyanate mit Biuret-, Isocyanurat-oder Uretdionstruktur".
Ullmanns Encyclopädie der technischen Chemie, 4$^{th}$ edition, vol. 19, Verlag Chemie, Weinheim (date unavailable) pp. 31-38, Dr. Dieter Maassen et al, "Polyalkylenglykole".
Methoden der organischen Chemie (Houben-Weyl) 4$^{th}$ edition, vol. E20, H. Bartl and J. Falbe, (month unavailable) 1987, pp. 1671-1682, D. Dieterich: Poly(urethane).
Analytical Chemistry, vol. 28, No. 12, Dec. 1956, pp. 1981-1983, George W. Sears, Jr., "Determination of Specific Surface Area of Colloidal Silica by Titration with Sodium Hydroxide".
Klebharze, R. Jordan, R. Hinterwaldner editors, (month unavailable) 1994, pp. 75-115, Otmar Ackermann, "Harzdispersionen".

* cited by examiner

*Primary Examiner* — William Cheung
(74) *Attorney, Agent, or Firm* — Robert S. Klemz; Noland J. Cheung

(57) ABSTRACT

An aqueous polymer dispersion that includes a) a polyurethane dispersion having an average particle size of 60 to 350 nm and b) an aqueous silicon dioxide dispersion having a particle diameter of the $SiO_2$ particles of 20 to 400 nm. The dispersion is prepared by mixing the polyurethane dispersion (a) with the silicon dioxide dispersion (b). The aqueous polymer dispersion can be used in adhesive compositions, which can be used to bond substrates together, especially substrates that are structural components of shoes.

15 Claims, No Drawings

AQUEOUS ADHESIVE DISPERSIONS

CROSS REFERENCE TO RELATED PATENT APPLICATION

The present patent application claims the right of priority under 35 U.S.C. §119 (a)-(d) of German Patent Application No. 103 43 675.8, filed Sep. 18, 2003.

BACKGROUND OF THE INVENTION

1. Field of the Invention

The invention relates to aqueous polymer dispersions based on polyurethanes, a process for their preparation and their use.

2. Description of the Prior Art

Adhesives based on polyarethanes are predominantly solvent-containing adhesives which are applied to the two substrates to be bonded and are dried. By subsequently joining the two substrates under pressure at RT or after thermal activation, a bond build-up with a high initial strength is obtained immediately after the joining operation.

For ecological reasons there is an increasing demand for suitable aqueous adhesive dispersions which can be processed to corresponding aqueous adhesive formulations. Such systems have the disadvantage that after evaporation of the water the initial heat resistance immediately after the joining operation is significantly lower compared with solvent-containing adhesives, in spite of prior thermal activation of the dry adhesive film.

The use of silica products for various applications is known from the prior art. While solid $SiO_2$ products are often employed as fillers or adsorbents for controlling rheological properties, the use as a binder of diverse inorganic materials, as a polishing agent for semiconductors or as a flocculation partner in colloidal chemical reactions dominates in the case of silica sols. For example, EP-A 0 332 928 discloses the use of polychloroprene latices in the presence of silica sols as an impregnating layer in the production of fireproofing elements. FR-A 2 341 537 and FR-A 2 210 699 describe pyrogenic silicas in combination with polychloroprene latices for the production of flame-resistant foam finishes or for bitumen improvement, and JP-A 06 256 738 describes them in combination with chloroprene/acrylic acid copolymers.

The present invention was based on the object of providing aqueous adhesive compositions which, after application to the substrates to be glued and joining, have a high initial heat resistance, especially after thermal activation.

SUMMARY OF THE INVENTION

The present invention is directed to an aqueous polymer dispersion that includes
 a) a polyurethane dispersion having an average particle size of 60 to 350 nm and
 b) an aqueous silicon dioxide dispersion having a particle diameter of the $SiO_2$ particles of 20 to 400 nm.

The present invention is also directed to a process for preparing the above-described polymer dispersion by mixing the polyurethane dispersion (a) with the silicon dioxide dispersion (b) and optionally adding conventional auxiliary substances for adhesives and additives.

The present invention is further directed to an adhesive composition that includes the above-described polymer dispersion.

The present invention is additionally directed to substrates bonded together by the above-described polymer dispersion and in particular to when the substrates are structural components of shoes or are shoes.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

It has been found, surprisingly, that adhesives which show a high initial heat resistance after joining can be prepared by a suitable combination of polyurethane dispersions and aqueous silicon dioxide dispersions.

The present invention relates to aqueous polymer dispersions comprising
 a) at least one polyurethane dispersion having an average particle diameter of 60 to 350 nm, preferably 20 to 80 nm, as determined by laser correlation spectroscopy, and
 b) at least one aqueous silicon dioxide dispersion having a particle diameter of the $SiO_2$ particles of 20 to 400 nm, preferably 30 to 100 nm, particularly preferably 40 to 80 nm, as determined by ultracentrifuge.

The polyurethane dispersions (a) to be employed according to the invention comprise polyurethanes (A) which are reaction products of the following components:
 A1) polyisocyanates,
 A2) polymeric polyols and/or polyamines having average molecular weights of 400 to 8,000,
 A3) optionally mono- or polyalcohols or mono- or polyamines or amino alcohols having molecular weights of up to 400,
and at least one compound chosen from
 A4) compounds which contain at least one ionic or potentially ionic group and/or
 A5) nonionically hydrophilized compounds.

In the context of the invention, a potentially ionic group is a group which is capable of formation of an ionic group.

The polyurethanes (A) are preferably prepared from 7 to 45 wt. % A1), 50 to 91 wt. % A2), 0 to 15 wt. % A5), 0 to 12 wt. % of ionic or potentially ionic compounds A4) and optionally 0 to 30 wt. % of compounds A3), wherein the sum of A4) and A5) is 0.1 to 27 wt. % and the sum of the components adds up to 100 wt. %.

The polyurethanes (A) are particularly preferably built up from 10 to 30 wt. % A1), 65 to 90 wt. % A2), 0 to 10 wt. % A5), 3 to 9 wt. % of ionic or potentially ionic compounds A4) and optionally 0 to 10 wt. % of compounds A3), wherein the sum of A4) and A5) is 0.1 to 19 wt. % and the sum of the components adds up to 100 wt. %.

The polyurethanes (A) are very particularly preferably prepared from 8 to 27 wt. % A1), 65 to 85 wt. % A2), 0 to 8 wt. % A5), 3 to 8 wt. % of ionic or potentially ionic compounds A4) and optionally 0 to 8 wt. % of compounds A3), wherein the sum of A4) and A5) is 0.1 to 16 wt. % and the sum of the components adds up to 100 wt. %.

Suitable polyisocyanates (A1) are aromatic, araliphatic, aliphatic or cycloaliphatic polyisocyanate. Mixtures of such polyisocyanates can also be employed. Examples of suitable polyisocyanates are butylene-diisocyanate, hexamethylene-diiusocyanate (HDI), isophorone-diisocyanate (IPDI), 2,2,4- and/or 2,4,4-trimethyl-hexamethylene-diisocyanate, the isomeric bis(4,4'-isocyanatocyclohexyl)methanes or mixtures thereof of any desired isomer content, isocyanatomethyl-1,8-octane-diisocyanate, 1,4-cyclohexylene-diisocyanate, 1,4- phenylene-diisocyanate, 2,4- and/or 2,6-toluylene-diisocyanate, 1,5-naphthylene-diisocyanate, 2,4'- or 4,4'-diphenylmethane-diisocyanate, triphenylmethane-4,4',4"-triisocyanate or derivatives thereof with a urethane, isocyanurate, allophanate, biuret, uretdione or iminooxadiazinedione structure and mixtures thereof. Hexamethylene-diisocyanate, isophorone-diisocyanate and the isomeric bis(4,4'-isocyanato-cyclohexyl)methanes and mixtures thereof are preferred.

The polyisocyanates are preferably polyisocyanates or polyisocyanate mixtures of the type mentioned with exclusively aliphatically and/or cycloaliphatically bonded isocyanate groups. Very particularly preferred starting components (A1) are polyisocyanates or polyisocyanate mixtures based on HDI, IPDI and/or 4,4'-diisocyanatodicyclohexylmethane.

Polyisocyanates which are furthermore suitable as polyisocyanates (A1) are any desired polyisocyanates which have a uretdione, isocyanurate, urethane, allophanate, biuret, iminooxadiazinedione and/or oxadiazinetrione structure and are built up from at least two diisocyanates and prepared by modification of simple aliphatic, cycloaliphatic, araliphatic and/or aromatic diisocyanates, such as are described, for example, in J. Prakt. Chem. 336 (1994) p. 185-200.

Suitable polymeric polyols or polyamines (A2) have an OH functionality of at least 1.5 to 4, such as, for example, polyacrylates, polyesters, polylactones, polyethers, polycarbonates, polyester-carbonates, polyacetals, polyolefins and polysiloxanes. Polyols in a molecular weight range of 600 to 2,500 with an OH functionality of 2 to 3 are preferred.

The possible polycarbonates containing hydroxy groups are obtainable by reaction of carbonic acid derivatives, e.g. diphenyl carbonate, dimethyl carbonate or phosgene, with diols. Possible such diols are e.g. ethylene glycol, 1,2- and 1,3-propanediol, 1,3- and 1,4-butanediol, 1,6-hexanediol, 1,8-octanediol, neopentylglycol, 1,4-bishydroxymethylcyclohexane, 2-methyl-1,3-propanediol, 2,2,4-trimethylpentane-1,3-diol, dipropylene glycol, polypropylene glycols, dibutylene glycol, polybutylene glycols, bisphenol A, tetrabromobisphenol A and also lactone-modified diols. The diol component preferably comprises 40 to 100 wt. % hexanediol, preferably 1,6-hexanediol and/or hexanediol derivatives, preferably those which, in addition to terminal OH groups, contain ether or ester groups, e.g. products which have been obtained by reaction of 1 mol of hexanediol with at least 1 mol, preferably 1 to 2 mol of caprolactone in accordance with DE-A 1 770 245 or by etherification of hexanediol with itself to give di- or trihexylene glycol. The preparation of such derivatives is known e.g. from DE-A 1 570 540. The polyether-polycarbonate diols described in DE-A 3 717 060 can also be employed.

The hydroxyl-polycarbonates should preferably be linear. However, they can optionally be slightly branched by incorporation of polyfunctional components, in particular low molecular weight polyols. Glycerol, trimethylolpropane, hexane-1,2,6-triol, butane-1,2,4-triol, pentaerythritol, chinitol, mannitol, and sorbitol, methyl glycoside and 1,3,4,6-dianhydrohexitols, for example, are suitable for this.

Suitable polyether-polyols are the polytetramethylene glycol polyethers which are known per se in polyurethane chemistry and can be prepared e.g. via polymerization of tetrahydrofuran by cationic ring opening.

Polyether-polyols which are moreover suitable are polyethers, such as e.g. the polyols, prepared using starter molecules, from styrene oxide, propylene oxide, butylene oxides or epichlorohydrin, in particular of propylene oxide.

Suitable polyester-polyols are e.g. reaction products of polyhydric, preferably dihydric and optionally additionally trihydric alcohols with polybasic, preferably dibasic carboxylic acids. Instead of the free polycarboxylic acids, it is also possible to use the corresponding polycarboxylic acid anhydrides or corresponding polycarboxylic acid esters of lower alcohols or mixtures thereof for the preparation of the polyesters. The polycarboxylic acids can be aliphatic, cycloaliphatic, aromatic and/or heterocyclic in nature and optionally substituted, e.g. by halogen atoms, and/or unsaturated.

The components (A3) are suitable for termination of the polyurethane prepolymer. Monofunctional alcohols and monoamines are possible for this. Preferred monoalcohols are aliphatic monoalcohols having 1 to 18 C atoms, such as e.g. ethanol, n-butanol, ethylene glycol monobutyl ether, 2-ethylhexanol, 1-octanol, 1-dodecanol or 1-hexadecanol. Preferred monoamines are aliphatic monoamines, such as e.g. diethylamine, dibutylamine, ethanolamine, N-methylethanolamine or N,N-diethanolamine and amines of the Jeffamin® M series (Huntsman Corp. Europe, Belgium) or amino-functional polyethylene oxides and polypropylene oxides. Polyols, aminopolyols or polyamines having a molecular weight of below 400, a large number of which are described in the appropriate literature, are also suitable as component (A3).

Preferred components (A3) are, for example:

a) alkanediols and -triols, such as ethanediol, 1,2- and 1,3-propanediol, 1,4- and 2,3-butanediol, 1,5-pentanediol, 1,3-dimethylpropanediol, 1,6-hexanediol, neopentylglycol, 1,4-cyclohexanedimethanol, 2-methyl-1,3-propanediol, 2-ethyl-2-butylpropanediol, trimethylpentanediol, diethyloctanediol position isomers, 1,2- and 1,4-cyclohexanediol, hydrogenated bisphenol A [2,2-bis(4-hydroxycyclohexyl)-propane], 2,2-dimethyl-3-hydroxypropionic acid 2,2-dimethyl-3-hydroxypropyl ester, trimethylolethane, trimethylolpropane or glycerol, b) ether-diols, such as diethylene diglycol, triethylene glycol, tetraethylene glycol, dipropylene glycol, tripropylene glycol, 1,3-butylene glycol or hydroquinone dihydroxyethyl ether, c) ester-diols of the general formulae (I) and (II)

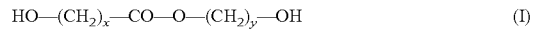

$$HO-(CH_2)_x-CO-O-(CH_2)_y-OH \qquad (I)$$

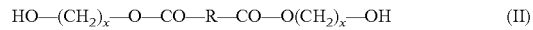

$$HO-(CH_2)_x-O-CO-R-CO-O(CH_2)_x-OH \qquad (II)$$

in which

R is an alkylene or arylene radical having 1 to 10 C atoms, preferably 2 to 6 C atoms, x is 2 to 6 and y is 3 to 5, such as e.g. δ-hydroxybutyl-ε-hydroxy-caproic acid esters, ω-hydroxyhexyl-γ-hydroxybutyric acid esters, adipic acid β-hydroxyethyl ester and terephthalic acid bis(β-hydroxy-ethyl) ester, and d) di- and polyamines, such as e.g. 1,2-diaminoethane, 1,3-diaminopropane, 1,6-diaminohexane, 1,3- and 1,4-phenylenediamine, 4,4'-diphenyl-methanediamine, isophoronediamine, an isomer mixture of 2,2,4- and 2,4,4-trimethylhexamethylenediamine, 2-methylpentamethylenediamine, diethylenetriamine, 1,3- and 1,4-xylylenediamine, α,α,α',α'-tetramethyl-1,3- and -1,4-xylylenediamine, 4,4-diaminodicyclohexylmethane, amino-functional polyethylene oxides or polypropylene oxides which are obtainable under the name of Jeffamin®, D series (Huntsman Corp. Europe, Belgium), diethylenetriamine and triethylenetetramine. Suitable diamines in the context of the invention are also hydrazine, hydrazine hydrate and substituted hydrazines, such as e.g. N-methylhydrazine, N,N'-dimethylhydrazine and homologues thereof, as well as acid dihydrazides, adipic acid, β-methyladipic acid, sebacic acid, hydracrylic acid and terephthalic acid, semicarbazidoalkylene hydrazides, such as e.g. β-semicarbazidopropionic acid hydrazide (e.g. described in DE-A 1 770

591), semicarbazidoalkylene-carbazine esters, such as e.g. 2-semi-carbazidoethylcarbazine ester (e.g. described in DE-A 1 918 504) or also aminosemicarbazide compounds, such as e.g. β-aminoethylsemicarbazido-carbonate (e.g. described in DE-A 1 902 931).

Component (A4) contains ionic groups, which can be either cationic or anionic in nature. Compounds having a cationic or anionic dispersing action are those which contain, for example, sulfonium, ammonium, phosphonium, carboxylate, sulfonate or phosphonate groups or groups which can be converted into the abovementioned groups by salt formation (potentially ionic groups) and can be incorporated into the macromolecules by isocyanate-reactive groups which are present. Preferred suitable isocyanate-reactive groups are hydroxyl and amino groups.

Suitable ionic or potentially ionic compounds (A4) are e.g. mono- and dihydroxycarboxylic acids, mono- and diaminocarboxylic acids, mono- and dihydroxysulfonic acids, mono- and diaminosulfonic acids and mono- and dihydroxyphosphonic acids or mono- and diaminophosphonic acids and their salts, such as dimethylolpropionic acid, dimethylolbutyric acid, hydroxypivalic acid, N-(2-aminoethyl)-β-alanine, 2-(2-amino-ethylamino)-ethanesulfonic acid, 1,2- or 1,3-propylenediamine-β-ethylsulfonic acid, ethylenediamine-propyl- or -butylsulfonic acid, malic acid, citric acid, glycollic acid, lactic acid, glycine, alanine, taurine, lysine, 3,5-diaminobenzoic acid, an addition product of IPDI and acrylic acid (EP-A 0 916 647, example 1) and alkali metal and/or ammonium salts thereof; the adduct of sodium bisulfite on but-2-ene-1,4-diol, polyether-sulfonate, the propoxylated adduct of 2-butenediol and NaHSO$_3$, e.g. described in DE-A 2 446 440 (page 5-9, formula I-III) and units which can be converted into cationic groups, such as N-methyl-diethanolamine, as hydrophilic builder components. Preferred ionic or potentially ionic compounds are those which have carboxyl or carboxylate and/or sulfonate groups and/or ammonium groups. Particularly preferred ionic compounds are those which contain carboxyl and/or sulfonate groups as ionic or potentially ionic groups, such as the salts of N-(2-aminoethyl)-β-alanine, of 2-(2-amino-ethylamino)-ethanesulfonic acid or of the addition product of IPDI and acrylic acid (EP-A 0 916 647, example 1) as well as of dimethylolpropionic acid.

Suitable compounds (A5) having a nonionic hydrophilizing action are e.g. polyoxyalkylene ethers which contain at least one hydroxyl or amino group. These polyethers contain a content of 30 wt. % to 100 wt. % of units which are derived from ethylene oxide. Possible polyethers are polyethers which are linear in structure and have a functionality of between 1 and 3, and also compounds of the general formula (III)

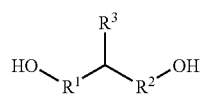

(III)

in which
R$^1$ and R$^2$ independently of one another in each case denote a divalent aliphatic, cycloaliphatic or aromatic radical having 1 to 18 C atoms, which can be interrupted by oxygen and/or nitrogen atoms, and
R$^3$ represents an alkoxy-terminated polyethylene oxide radical.

Compounds having a nonionic hydrophilizing action are, for example, also monofunctional polyalkylene oxide polyether alcohols having a statistical average of 5 to 70, preferably 7 to 55 ethylene oxide units per molecule, such as are accessible in a manner known per se by alkoxylation of suitable starter molecules (e.g. in Ullmanns Encyclopädie der technischen Chemie, 4th edition, volume 19, Verlag Chemie, Weinheim p. 31-38).

Suitable starter molecules are, for example, saturated monoalcohols, such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxy-methyloxetane or tetrahydrofurfuryl alcohol, diethylene glycol monoalkyl ethers, such as, for example, diethylene glycol monobutyl ether, unsaturated alcohols, such as allyl alcohol, 1,1-dimethylallyl alcohol or oleyl alcohol, aromatic alcohols, such as phenol, the isomeric cresols or methoxyphenols, araliphatic alcohols, such as benzyl alcohol, anisyl alcohol or cinnamyl alcohol, secondary monoamines, such as dimethylamine, diethylamine, dipropylamine, diisopropylamine, dibutylamine, bis-(2-ethylhexyl)-amine, N-methyl- and N-ethylcyclohexylamine or dicyclohexylamine, and heterocyclic secondary amines, such as morpholine, pyrrolidine, piperidine or 1H-pyrazole. Preferred starter molecules are saturated monoalcohols. Diethylene glycol monobutyl ether is particularly preferably used as the starter molecule.

Alkylene oxides which are suitable for the alkoxylation reaction are, in particular, ethylene oxide and propylene oxide, which can be employed in the alkoxylation reaction in any desired sequence or also in a mixture.

The polyalkylene oxide polyether alcohols are either pure polyethylene oxide polyethers or mixed polyalkylene oxide polyethers, the alkylene oxide units of which consist of ethylene oxide units to the extent of at least 30 mol %, preferably to the extent of at least 40 mol %. Preferred nonionic compounds are monofunctional mixed polyalkylene oxide polyethers which contain at least 40 mol % of ethylene oxide units and not more than 60 mol % of propylene oxide units.

A combination of nonionic (A4) and ionic (A5) hydrophilizing agents is preferably used for the preparation of the polyurethane (A). Combinations of nonionic and anionic hydrophilizing agents are particularly preferred.

The preparation of the aqueous polyurethane (A) can be carried out in one or more stages in a homogeneous or, in the case of a multi-stage reaction, in part in a disperse phase. After the polyaddition has been carried out completely or in part, a dispersing, emulsifying or dissolving step takes place. A further polyaddition or modification in a disperse phase is then carried out if appropriate.

All the processes known from the prior art can be used for the preparation of the polyurethane (A), such as an emulsifier-shearing forces, acetone, prepolymer-mixing, melt-emulsifying, ketimine and solid spontaneous dispersing process, or derivatives thereof. A summary of these methods is to be found in Methoden der organischen Chemie (Houben-Weyl, supplementary and subsequent volumes to the 4th edition, volume E20, H. Bartl and J. Falbe, Stuttgart, N.Y., Thieme 1987, p. 1671-1682). The melt-emulsifying, prepolymer-mixing and the acetone process are preferred. The acetone process is particularly preferred.

Conventionally, for the preparation of a polyurethane prepolymer, constituents (A2) to (A5) which contain no primary or secondary amino groups and a polyisocyanate (A1) are initially introduced in their entirety or in part into the reactor and, if appropriate diluted with a solvent which is water-miscible but inert towards isocyanate groups, but preferably without a solvent, are heated up to relatively high temperatures, preferably in the range from 50 to 120° C.

Suitable solvents are e.g. acetone, butanone, tetrahydrofuran, dioxane, acetonitrile, dipropylene glycol dimethyl ether and 1-methyl-2-pyrrolidone, which can be added not only at the start of the preparation, but optionally also in portions later.

Acetone and butanone are preferred. It is possible to carry out the reaction under normal pressure or increased pressure, e.g. above the normal pressure boiling point of a solvent, such as e.g. acetone.

The catalysts known for acceleration of the isocyanate addition reaction, such as e.g. triethylamine, 1,4-diazabicyclo-[2,2,2]-octane, dibutyltin oxide, tin dioctoate or dibutyltin dilaurate, tin bis-(2-ethylhexanoate) or other organometallic compounds, furthermore can be initially introduced at the same time or metered in later. Dibutyltin dilaurate is preferred.

The constituents (A1), (A2), optionally (A3) and (A4) and/or (A5) which, where appropriate, have not yet been added at the start of the reaction and which contain no primary or secondary amino groups are then metered in. In the preparation of the polyurethane prepolymer, the ratio of the substance amounts of isocyanate groups to groups which are reactive with isocyanate is 0.90 to 3, preferably 0.95 to 2.5, particularly preferably 1.05 to 2.0. The reaction of components (A1) to (A5) takes place in part or completely, but preferably completely, in respect of the total amount of groups which are reactive with isocyanates of the part of (A2) to (A5) which contains no primary or secondary amino groups. The degree of conversion is conventionally monitored by monitoring the NCO content of the reaction mixture. Both spectroscopic measurements, e.g. infrared or near infrared spectra, determinations of the refractive index and chemical analyses, such as titrations of samples taken, can be carried out for this. Polyurethane prepolymers which contain free isocyanate groups are obtained as the substance or in solution.

After or during the preparation of the polyurethane prepolymers from (A1) and (A2) to (A5) the partial or complete salt formation of the groups having an anionic or cationic dispersing action takes place, if this has not yet been carried out in the starting molecules. In the case of anionic groups, bases, such as ammonia, ammonium carbonate or bicarbonate, trimethylamine, triethylamine, tributylamine, diisopropylethylamine, dimethylethanolamine, diethyl-ethanolamine, triethanolamine, potassium hydroxide or sodium carbonate, preferably triethylamine, triethanolamine, dimethylethanolamine or diiso-propylenethylamine, are employed for this. The substance amount of the bases is between 50 and 100%, preferably between 60 and 90% of the substance amount of the anionic groups. In the case of cationic groups, dimethyl sulfate or succinic acid is employed. If only nonionically hydrophilized compounds (A5) with ether groups are used, the neutralization step is omitted. The neutralization can also be carried out simultaneously with the dispersing, by the dispersing water already containing the neutralizing agent.

Possible aminic components are (A2), (A3) and (A4), with which isocyanate groups which still remain can be reacted, if appropriate. This chain lengthening can be carried out here either in the solvent before the dispersing, during the dispersing, or in water after the dispersing. If aminic components are employed as (A4), the chain lengthening is preferably carried out before the dispersing.

The aminic components (A2), (A3) or (A4) can be added to the reaction mixture in a form diluted with organic solvents and/or with water. Preferably, 70 to 95 wt. % of solvent and/or water is employed. If several aminic components are present, the reaction can be carried out successively in any desired sequence or simultaneously by addition of a mixture.

For the purpose of preparation of the polyurethane dispersion (A), the polyurethane prepolymers, optionally using severe shearing forces, such as e.g. vigorous stirring or using a jet stream disperser, either are introduced into the dispersing water or, conversely, the dispersing water is stirred into the prepolymers. The increase in molecular weight, if this has not yet taken place in the homogeneous phase, can then subsequently take place by reaction of isocyanate groups which may be present with components (A2), (A3). The amount of polyamine (A2), (A3) employed depends on the unreacted isocyanate groups still present. Preferably, 50 to 100%, particularly preferably 75 to 95% of the substance amount of the isocyanate groups is reacted with polyamines (A2), (A3).

If appropriate, the organic solvent can be distilled off. The dispersions have a solids content of 10 to 70 wt. %, preferably 25 to 65 wt. % and particularly preferably 30 to 60 wt. %.

The polyurethane dispersions according to the invention can be employed by themselves or with known binders, auxiliary substances and additives, in particular light stabilizers, such as UV absorbers and sterically hindered amines (HALS), and furthermore antioxidants, fillers as well as coating auxiliaries, e.g. antisettling agents, defoamers and/or wetting agents, flow agents, reactive diluents, plasticizers, catalysts, auxiliary solvents and/or thickeners and additives, such as, for example, dispersions, pigments, dyestuffs or matting agents. In particular, combinations with polyurethane dispersions or polyacrylate dispersions, which can optionally also be hydroxy-functional, are possible without problems. The additives can be added to the PU dispersions according to the invention immediately before processing. However, it is also possible to add at least some of the additives before or during the dispersing of the binder or binder/crosslinking agent mixture. The choice and the metering of these substances, which can be added to the individual components and/or the total mixture, are known to the expert.

Aqueous dispersions of silicon dioxide have been known for a long time. They are in the form of various structures, depending on the preparation process.

Silicon dioxide dispersions b) which are suitable according to the invention can be obtained on the basis of silica sol, silica gel, pyrogenic silicas or precipitation silicas or mixtures of those mentioned.

Silica sols are colloidal solutions of amorphous silicon dioxide in water, which are also called silicon dioxide sols, but usually abbreviated to silica sols. The silicon dioxide is present in these in the form of approximately spherical particles hydroxylated on the surface. The particle diameter of the colloidal particles is as a rule 1 to 200 nm, the specific BET surface area correlating to the particle size (determined by the method of G. N. Sears, Analytical Chemistry vol. 28, N. 12, 1981-1983, December 1956) being 15 to 2,000 m$^2$/g. The surface of the $SiO_2$ particles has a charge which is compensated by a corresponding counter-ion, which leads to stabilization of the colloidal solution. The silica sols stabilized by alkaline means have a pH of 7 to 11.5 and contain as the alkalizing agent, for example, small amounts of $Na_2O$, $K_2O$, $Li_2O$, ammonia, organic nitrogen bases, tetraalkylammonium hydroxides or alkali metal or ammoniun aluminates. Silica sols can also be in a weakly acid form as semi-stable colloidal solutions. It is furthermore possible to prepare cationically formulated silica sols by coating the surface with $Al_2(OH)_5Cl$. The solids concentrations of the silica sols are 5 to 60 wt. % $SiO_2$.

The preparation process for silica sols substantially passes through the production steps of dealkalization of water-glass by means of ion exchange, adjustment and stabilization of the particular desired particle size (distribution) of the $SiO_2$ particles, adjustment of the particular desired $SiO_2$ concentration and, if appropriate, carrying out of a surface modification of the $SiO_2$ particles, such as, for example, with $Al_2(OH)_5Cl$. In none of these steps do the $SiO_2$ particles leave the colloidally dissolved state. This explains the presence of the discrete primary particles with, inter alia, a high binder efficiency.

Silica gels are understood as meaning colloidally shaped or unshaped silicas of elastic to solid consistency with a loose to dense pore structure. The silicas are in the form of highly condensed polysilicas. Siloxane and/or silanol groups are present on the surface. Silica gels are prepared from waterglass by reaction with mineral acids.

A distinction is furthermore made between pyrogenic silica and precipitation silica. In the precipitation process, water is initially introduced into the reaction vessel and water-glass and acid, such as $H_2SO_4$, are then added simultaneously. Colloidal primary particles are formed by this procedure, and agglomerate and fuse together to agglomerates as the reaction progresses. The primary particles of these silicas, which are in the form of a solid, are firmly crosslinked to give secondary agglomerates.

Pyrogenic silica can be prepared by flame hydrolysis or with the aid of the arc process. The dominant synthesis process for pyrogenic silicas is flame hydrolysis, in which tetrachlorosilane is decomposed in an oxyhydrogen flame. The silica formed by this procedure is amorphous to x-rays. Pyrogenic silicas have significantly fewer OH groups on their virtually pore-free surface than precipitation silicas. The pyrogenic silicas prepared via flame hydrolysis have specific surface areas of 50 to 600 $m^2/g$ (DIN 66131) and primary particle sizes of 5 to 50 nm, and the silicas prepared via the arc process have specific surface areas of 25 to 300 $m^2/g$ (DIN 66131) and primary particle sizes of 5 to 500 nm.

Further information on the synthesis and properties of silicas in solid form is to be found, for example, in K. H. Büchel, H.-H. Moretto, P. Woditsch "Industrielle Anorganische Chemie", Wiley VCH Verlag 1999, chap. 5.8.

If an $SiO_2$ raw material in the form of an isolated solid, such as, for example, pyrogenic or precipitated silica, is employed for the polymer dispersions to be employed according to the invention, this is converted into an aqueous $SiO_2$ dispersion by dispersing.

Dispersers of the prior art are employed for the preparation of the silicon dioxide dispersions, preferably those which are suitable for generating high shear rates, such as e.g. Ultraturrax or dissolver discs.

Those aqueous silicon dioxide dispersions of which the $SiO_2$ particles have a primary particle size of 20 to 400 nm, preferably 30 to 100 nm and particularly preferably 40 to 80 nm are preferably employed. In the case of the precipitated silicas, these are ground for the purpose of reducing the particle size.

Preferred polymer dispersions according to the invention are those in which the $SiO_2$ particles of the silicon dioxide dispersion b) are in the form of discrete non-crosslinked primary particles.

It is also preferable for the $SiO_2$ particles to have hydroxyl groups on the particle surface.

Aqueous silica sols are particularly preferably employed as the aqueous silicon dioxide dispersions.

For the preparation of the polymer dispersions according to the invention, the ratios of amounts of the individual components are chosen such that the resulting dispersion has a content of dispersed polymers of 30 to 60 wt. %, wherein the content of the polyurethane dispersion (a) is 55 to 99 wt. % and that of the silicon dioxide dispersion (b) is 1 to 45 wt. %, the percentage data being based on the weight of non-volatile contents and adding up to 100 wt. %.

Preferably, the polymer dispersions according to the invention comprise a content of 70 wt. % to 98 wt. % of a polyurethane dispersion (a) and a content of 2 wt. % to 30 wt. % of a silica sol dispersion (b), and the mixtures of 80 wt. % to 93 wt. % of dispersion (a) and 20 wt. % to 7 wt. % of dispersion (b) are particularly preferred, the percentage data being based on the weight of non-volatile contents and adding up to 100 wt. %.

The polyurethane dispersion can optionally also contain other dispersions, such as e.g. polyacrylate, polyvinylidene chloride, polybutadiene, polyvinyl acetate, polychloroprene or styrene/butadiene dispersion, in a content of up to 30 wt. %.

The polymer dispersion according to the invention optionally comprise further auxiliary substances for adhesives and additives. For example, fillers, such as quartz flour, quartz sand, barite, calcium carbonate, chalk, dolomite or talc, optionally together with wetting agents, for example polyphosphates, such as sodium hexametaphosphate, naphthalenesulfonic acid or ammonium or sodium polyacrylic acid salts, can be added, the fillers being added in amounts of 10 to 60 wt. %, preferably 20 to 50 wt. %, and the wetting agents being added in amounts of 0.2 to 0.6 wt. %, all the data being based on non-volatile contents.

Further suitable auxiliary substances are, for example, organic thickeners, such as cellulose derivatives, alginates, starch, starch derivatives, polyurethane thickeners or polyacrylic acid, which are to be employed in amounts of 0.01 to 1 wt. %, based on non-volatile contents, or inorganic thickeners, such as, for example, bentonites, which are to be employed in amounts of 0.05 to 5 wt. %, based on non-volatile contents.

Fungicides can also be added to the adhesive composition according to the invention to preserve it. These are employed in amounts of 0.02 to 1 wt. %, based on non-volatile contents. Suitable fungicides are, for example, phenol and cresol derivatives or organotin compounds.

Tackifying resins, such as e.g. non-modified or modified naturally occurring resins, such as rosin ester, hydrocarbon resins or synthetic resins, such as phthalate resins, can optionally also be added to the polymer dispersion according to the invention in dispersed form (see e.g. in "Klebharze" R. Jordan, R. Hinterwaldner, p. 75-1, Hinterwaldner Verlag Munich 1994). Alkylphenol resin and terpenephenol resin dispersions with softening points above 70° C., particularly preferably above 110° C., are preferred.

A use of organic solvents, such as, for example, toluene, acetone, xylene, butyl acetate, methyl ethyl ketone, ethyl acetate, dioxane or mixtures thereof, or plasticizers, such as, for example, those based on adipate, phthalate or phosphate, in amounts of 0.5 to 10 parts by wt., based on non-volatile contents, is also possible.

The invention also provides a process for the preparation of the polymer dispersion according to the invention, characterized in that the polyurethane dispersion (a) is mixed with the silicon dioxide dispersion (b) and the conventional auxiliary substances for adhesives and additives are optionally added.

A preferred process for the preparation of the polymer dispersion according to the invention is characterized in that the polyurethane dispersion (a) is first mixed with the auxiliary substances for adhesives and additives and the silica sols (b) are added during or after the mixing.

The adhesive formulation can be applied in known manners, e.g. by brushing, pouring, knife-coating, spraying, rolling or dipping. The adhesive film can be dried at room temperature or elevated temperature up to 220° C.

The adhesive formulations can be employed as one component, or with the use of crosslinking agents in known manners.

The polymer dispersions according to the invention can be used as adhesives, for example for gluing any desired substrates of the same or a different nature, such as wood, paper, plastics, textiles, leather, rubber or inorganic materials, such as ceramic, stoneware, glass fibres or cement.

EXAMPLES

1.1 Substances Employed

TABLE 1

| Polyurethane dispersions | | | |
|---|---|---|---|
| Dispersion | Product | Delivery form | Supplier |
| A | Dispercoll ® U 53 | 40% dispersion of an aliphatic hydroxylpolyester-polyurethane; particle diameter 100 nm minimum activation temperature: 45-55° C. pH 6.0-9.0 | Bayer AG, Leverkusen, DE |
| B | Dispercoll ® U 54 | 50% dispersion of an aliphatic hydroxylpolyester-polyurethane; particle diameter 200 nm minimum activation temperature: 45-55° C. pH 6.0-9.0 | Bayer AG, Leverkusen, DE |

TABLE 2

| Silicon dioxides | | | |
|---|---|---|---|
| Product | Supplier | Delivery form | Type |
| Dispercoll ® S 5005 | Bayer AG, Lev., DE | silica sol dispersion, 50%, BET 50 m$^2$/g, pH 9, particle size 50 nm | silica sol |
| Dispercoll ® S 3030 | Bayer AG, Lev., DE | silica sol dispersion, 30%, BET 300 m$^2$/g, pH 10, particle size 9 nm | silica sol |

TABLE 3

| Crosslinking agent | | |
|---|---|---|
| Product | Function | Manufacturer |
| Desmodur ® DN | aliphatic crosslinking isocyanate based on HDI*[)], viscosity 1,250 ± 300 mPas, NCO content 21.8 ± 0.5% | Bayer AG, Lev., DE |

*[)]90.77 wt. % of polymeric hydrophilized HDI trimer (Desmodur ® N3600), 4.78 wt. % of an internal emulsifier with EO/PO started on the basis of a monofunctional alcohol, OH number 40

1.2 Measurement Methods

1.2.1 Determination of the Peel Strength on Flexible PVC After Shock Activation The test is carried out in accordance with EN 1392. On two test specimens of flexible PVC (30% dioctyl phthalate, DOP) of dimensions 100×30 mm, roughened with abrasive paper (grain 80), the dispersion is applied to the roughened surface on both sides by means of a brush and dried at room temperature for 60 min. The test specimens are then shock-activated. The adhesive surfaces are irradiated with an IR lamp from Funk (Shock Activator 2000) for 10 seconds. During this operation the adhesive film heats up to a surface temperature of 90±2° C. Gluing takes place immediately after the thermal activation of the test specimens coated with adhesive by laying the activated adhesive layers against one another and pressing them in a press (60 seconds; 4 bar line pressure). A tear test is carried out on a commercially available tensile tester at room temperature. The strength values are determined immediately after the gluing and after three days. The test specimens are stored at 23° C. and 50% relative humidity.

1.2.2 Determination of the Initial Heat Resistance (IHR) on Beech Wood/Rigid PVC Materials:
  Beech wood test specimen 50×150×4 mm
  PVC film (Renolit 32052096 Strukton; Renolit Worms, DE) Desmodur® DN Application of Adhesive:
  Application of adhesive as one component with a doctor knife, 200 μm Air Evaporation Time:
  At least 3 hours after application of adhesive at room temperature Pressing Conditions:
  10 s at a joining temperature of 77° C. under a pressing pressure of 4 bar Test Conditions in the Drying Cabinet:
  80° C. circulating air drying cabinet, load 2.5 kg Procedure:
  The adhesive is applied as one component to the wooden test specimen with a doctor knife (200 μm). The film is cut such that after folding over the edge three times the total length is 12 cm. 3 hours after application of the adhesive, the wooden test specimen is joined to the film at a joining temperature of 77° C. under an effective pressure of 4 bar for 10 s on a membrane press.

Immediately thereafter the composite is laid for 3 min without a weight in the thermal stability drying cabinet and then loaded with 2.5 kg for 5 min. For this, the wooden test specimen is suspended in the thermal cabinet and the clamping device with the weight is clamped on the film, which has been folded over three times for strengthening. At the end of the period of time, the weight is removed immediately and the composite is released. The peel zone is measured and stated in [mm/min].

1.3 Preparation of the Adhesive Composition

For the preparation of the formulation, the polyurethane dispersion is initially introduced into a glass beaker. The silicon dioxide is added, while stirring. For a two-component gluing 100 parts by weight of dispersion are homogenized with 3 parts by weight of an emulsifiable crosslinking isocyanate for at least 2 min. This mixture can be used for approx. 2 h.

TABLE 4

| Formulations | | | | | | |
|---|---|---|---|---|---|---|
| | Recipe (data in parts by wt.) | | | | | |
| Product | 1 | 2 | 3 | 4 | 5 | 6 |
| Polyurethane dispersion: | | | | | | |
| A | 100 | 100 | 100 | | | |
| B | | | | 100 | 100 | 100 |

TABLE 4-continued

Formulations

| Product | Recipe (data in parts by wt.) | | | | | |
|---|---|---|---|---|---|---|
| | 1 | 2 | 3 | 4 | 5 | 6 |
| Silicon dioxide type | | | | | | |
| Dispercoll ® S 5005 | — | 26 | — | 32.5 | | |
| Dispercoll ® S 3030 | — | | 43 | — | | 54.1 |

1.4 Results
1.4.1 Determination of the Peel Strength on Flexible PVC

TABLE 5

Peel strength flexible PVC

| Example no. | Formulation no. | Desmodur DN [pts.] | Peel strength immediately [N/mm] | Peel strength after 3 days [N/mm] |
|---|---|---|---|---|
| 1* | 1 | — | 5.0 | 10.2 |
| 2* | 1 | 3 | 3.5 | 10.1 |
| 3 | 2 | — | 6.1 | 9.5 |
| 4 | 2 | 3 | 5.2 | 9.5 |
| 5* | 3 | — | 1.0 | 1.0 |
| 6* | 3 | 3 | 0.9 | 2.3 |
| 7* | 4 | — | 6.1 | 8.9 |
| 8* | 4 | 3 | 5.5 | 8.7 |
| 9 | 5 | — | 5.5 | 5.4 |
| 10 | 5 | 3 | 5.4 | 7.0 |
| 11* | 6 | — | 1.4 | 0.2 |
| 12* | 6 | 3 | 1.6 | 0.8 |

*comparison examples

As can be seen from table 5, the addition of Dispercoll® S 5005 has the effect of a strength which is at the same level as that of non-formulated PU dispersions. Formulation with Dispercoll® S 3030 has the effect of a significant deterioration in the peel strength on flexible PVC.

1.4.2 Determination of the Initial Heat Resistance on Beech Wood/Rigid PVC

TABLE 6

Initial heat resistance

| Example no. | Formulation no. | IHR [mm/minute] |
|---|---|---|
| 13* | 4 | 9.8 |
| 14 | 5 | 1.9 |
| 15* | 6 | peeling |

*comparison examples

As can be seen from table 6, the addition of Dispercoll® S 5005 has the effect of a significant improvement in the initial heat resistance compared with the non-formulated PU dispersion. Formulation with Dispercoll® S 3030 leads to complete peeling of the test specimens.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous polymer dispersion comprising
   a) a polyurethane dispersion which has an average particle size of 60 to 350 nm and is the reaction product of
   A1) a polyisocyanate with
   A2) a polymeric polyol or a polyamine having an average molecular weight of 400 to 8000,
   A3) optionally a monoalcohol, a polyalcohol other than A2), a monoamine, a polyamine other than A2) or an aminoalcohol, and at least one of
   A4) a compound that contains at least one ionic or potential ionic group or
   A5) a nonionic hydrophilic compound,
      provided that if a monoamine is present, the monoamine is selected from the group consisting of diethylamine, dibutylamine, amino-functional polyethylene oxides and amino-functional polypropylene oxides,
      wherein the reaction product contains 7 to 45 wt. % of A1), 50 to 91 wt. % of A2). 0 to 30 wt. % of A3). 0 to 12 wt. % of A4) and 0 to 15 wt. % of A5), wherein the sum of A4) and A5) is 0.1 to 27 wt. % and the sum of A1) to A5) adds up to 100 wt. %;
   and
   b) an aqueous silicon dioxide dispersion having a particle diameter of the $SiO_2$ particles of 20 to 400 nm,
      wherein the aqueous polymer dispersion is an adhesive composition and comprises 80-93 wt. % of the polyurethane dispersion and 7-20 wt. % of the silicon dioxide dispersion.

2. The aqueous polymer dispersion according to claim 1, wherein the $SiO_2$ particles have a particle diameter of 30 to 100 nm.

3. The aqueous polymer dispersion according to claim 1, wherein the $SiO_2$ particles have a particle diameter of 40 to 80 nm.

4. The aqueous polymer dispersion according to claim 1, wherein the $SiO_2$ particles are in the form of discrete non-crosslinked primary particles.

5. The aqueous polymer dispersion according to claim 1, wherein the $SiO_2$ particles have hydroxyl groups on the particle surface.

6. The aqueous polymer dispersion according to claim 1, wherein the aqueous silicon dioxide dispersion b) is an aqueous silica sol.

7. A process for the preparation of the polymer dispersions according to claim 1 comprising mixing the polyurethane dispersion (a) with the silicon dioxide dispersion (b) and optionally adding conventional auxiliary substances for adhesives and additives.

8. Substrates bonded together by the polymer dispersions according to claim 1.

9. Substrates according to claim 8, wherein the substrates are structural components of shoes or shoes.

10. The aqueous polymer dispersion according to claim 2, wherein the $SiO_2$ particles are in the form of discrete non-crosslinked primary particles.

11. The aqueous polymer dispersion according to claim 3, wherein the $SiO_2$ particles are in the form of discrete non-crosslinked primary particles.

12. The aqueous polymer dispersion according to claim 2, wherein the $SiO_2$ particles have hydroxyl groups on the particle surface.

13. The aqueous polymer dispersion according to claim 3, wherein the $SiO_2$ particles have hydroxyl groups on the particle surface.

14. The aqueous polymer dispersion according to claim 2, wherein the aqueous silicon dioxide dispersion b) is an aqueous silica sol.

15. The aqueous polymer dispersion according to claim 3, wherein the aqueous silicon dioxide dispersion b) is an aqueous silica sol.

* * * * *